Patented Nov. 8, 1949

2,487,119

UNITED STATES PATENT OFFICE 2,487,119

PORCELAIN ENAMEL COMPOSITIONS CONTAINING LITHIUM MANGANITE AND/OR LITHIUM COBALTITE

Walter M. Fenton, Minneapolis, Minn., assignor to Metalloy Corporation, Minneapolis, Minn., a corporation of Minnesota No Drawing. Application October 4, 1946, Serial No. 701,066

11 Claims. (Cl. 106—48)

My invention relates to improvements in vitreous or porcelain enamel, hereinafter referred to simply as enamel, compositions and is especially concerned with the production of novel and improved enamel frits for use as ground coats for iron and steel.

In both the dry and wet processes of enameling metals, a frit is initially prepared which, generally speaking, is made by melting siliceous materials, such as quartz or feldspar or both, together with fluxes and metallic oxides and other agents such as, for example, borax, soda ash, fluorspar, cryolite, sodium nitrate, potassium nitrate, zinc oxide, nickel oxide, cobalt oxide, manganese oxides, lithium oxide, barium carbonate, titanium oxide, and the like. The resulting fused material, which forms a glass-like mass, is then run into a tank of cold water the result of which is to cause the molten glass-like mass to shatter into a large number of friable pieces of vitreous materials commonly called enamel frits. Frequently, the metallic oxides are introduced into the frit composition in the form of the carbonate salt, for example, lithium carbonate, which, under the high temperatures used in producing the frit and the final enamel coatings, breaks down to the oxide. In use, the frits are milled together with certain so-called mill additions, such as clays, feldspars, borax, magnesium carbonate, etc. and then applied to the metal base and subjected to elevated temperatures to cause the enamel composition to fuse and adhere to the metal base. Where the wet process is employed, the mill addition includes water and the resulting enamel "slip," which comprises an aqueous suspension of the frit and certain of the mill addition agents, is applied to the metal base by dipping, spraying or slushing procedures.

I have found that the incorporation into enamel frits or enamel compositions of minor proportions of lithium manganite or lithium cobaltite or mixtures thereof results in marked improvements therein. These improvements reflect themselves, in general, in causing the enamel to fire to maturity in a relatively short period of time, in the use of lower firing temperatures, in obtaining improved adherence between the iron or steel surface and the enamel where it is used as a ground coat, and in eliminating the use of cobalt oxide in the ground coat. In this latter connection, it may be observed that it is generally regarded, by workers versed in the art, as desirable, if not reasonably necessary, to incorporate cobalt oxide into enamel ground coats in order to obtain satisfactory adherence of such ground coats to the iron or steel base. I have found that the use of lithium manganite in the ground coat renders unnecessary the use of cobalt oxide in such compositions without detriment to the strength of the bond and, indeed, in many instances the result is to produce a bond of enhanced strength. Lithium cobaltite functions in a generally similar manner to lithium manganite. While, therefore, the elimination of cobalt oxide, or substances which in the preparation of the frit or the enamel decompose to cobalt oxide, represents one important phase of my present invention, it should be understood that my invention encompasses such enamel compositions which may include cobalt oxide since the utilization of lithium manganite and/or lithium cobaltite brings about important advantages over and above the advantage of enhanced strength of bond or adherence.

It should be pointed out that lithium manganite and lithium cobaltite are stable at the elevated temperatures used in preparing the frits and the enamel coatings and do not decompose during the fusion steps involved in such operations but, rather, remain as such and contribute their useful properties to the frits and the enamels produced therefrom. It should also be understood that the results obtained pursuant to my present invention are not achieved through the use of lithium oxide or lithium carbonate or through the use thereof in frits or enamel compositions containing the usual frit or enamel ingredients such as those referred to previously. The exact mechanism of the functioning of the lithium manganite and the lithium cobaltite has not been fully ascertained and I prefer, therefore, to avoid conjecture as to what may account for the peculiar functioning of said compounds in the enamel compositions.

The proportions of lithium manganite and/or lithium cobaltite in the enamel frits are subject to relatively wide variation although, in all instances, they comprise a distinctly minor proportion of the enamel frit. In general, from about 0.5 to about 5% and in certain cases up to about 10% of lithium manganite, based upon the weight of the frit, will serve to achieve good results pursuant to the present invention, the optimum percentage depending upon the particular enamel frit composition employed. In most cases, from about 0.5% to about 2% of lithium manganite will serve effectively. In the case of lithium cobaltite, lesser proportions thereof than lithium manganite are usually employed as, for example, proportions of the order of about 0.05% to about 2% or 3%, preferably about 0.05% to 1%. Where mixtures of lithium manganite and lithium cobaltite are utilized, their combined proportions should ordinarily not exceed about 10% and should preferably fall within the range of about 0.5 to about 2 or 3% based upon the weight of the enamel frit.

As I have indicated above, my invention finds particular utility in the preparation of enamel frits for use in ground coats for application to iron, for example, cast iron, or steel, for example, in the form of hollow ware or flatware such as sheets. The utility of lithium manganite and/or lithium cobaltite extends, also, to cover coat enamels, where, for example, fluidity characteristics and the like are obtained which are not possible where, for example, lithium oxide or compounds which decompose to form lithium oxide in the enamel are utilized. It may also be pointed out that, in the case of white cover coat enamels, where titanium oxide is utilized as an opacifier, the yellow tinge peculiar to such enamels is, in many cases, eliminated and the desired "blue-white" shade is obtained when lithium cobaltite is employed.

Lithium manganite, which has the formula $Li_2MnO_3$, may be prepared by heating, at an elevated reaction temperature, an oxygen-containing lithium compound with an oxygen-containing manganese compound which, at said elevated reaction temperature, is present as manganese oxide. A preferred procedure for the preparation of lithium manganite comprises heating a mixture of substantially equi-molal proportions of lithium carbonate and manganese carbonate, in an oxidizing atmosphere, at a temperature in the range of about 560 degrees C. to about 1100 degrees C. Illustrative examples of the preparation of lithium manganite are as follows:

Example A

Equi-molal proportions of lithium carbonate and manganese carbonate were well mixed together and heated at about 1000 degrees C. for 1 hour in a tube furnace in a current of oxygen. The product obtained was a bright red powder, showing no sign of fusion or sintering, and free of carbon dioxide. On analysis, the product was found to correspond to the formula $Li_2MnO_3$.

Example B

Equi-molal proportions of lithium carbonate and manganese carbonate were reacted, as described in Example A, with the exception that a current of air was substituted for the current of oxygen. The resulting bright red product, on analysis, was shown to correspond to the formula $Li_2MnO_3$.

Example C

A mixture of 235 pounds of a natural manganese dioxide ore and technical lithium carbonate, in approximately equi-molal proportions of contained manganese dioxide and lithium carbonate, was heated at 950–1000 degrees C. for 2 hours in a hearth-type gas-fired furnace and yielded 172 pounds of technical lithium manganite.

Lithium cobaltite ($LiCoO_2$) may be prepared by reacting a cobalt oxide with lithium carbonate at elevated temperatures. Thus, for example, in the case of $Co_2O_3$, it is admixed with lithium carbonate in substantially equimolecular proportions and heated, preferably indirectly, at about 900 degrees C. for about one-half hour, carbon dioxide being evolved during the reaction. If $Co_3O_4$ or $CoO$ or a cobalt compound in which the cobalt has a valence of 2, such as $CoCO_3$, is utilized, the reaction should be carried out in an oxidizing atmosphere as, for example, by blowing a stream of air through the furnace in which the reaction is being conducted. The following example is illustrative of a convenient and satisfactory method of producing lithium cobaltite:

Example D

An intimate mixture was made of 1150 parts of lithium carbonate and 2500 parts of powdered "black cobalt oxide" (probably intermediate between $Co_3O_4$ and $Co_2O_3$), said parts being by weight, and said mixture was heated or fired in an exteriorly heated rotary kiln open at both ends, a current of air being passed through the kiln during the heating operation. The heating was carried out at about 900 to 1000° C. for approximately 2½ hours. The final product comprised a relatively soft mass which consisted essentially of lithium cobaltite, showing no evidence of fusion, and being easily ground to a fine powder.

The following examples are illustrative of enamel compositions, in the form of frits, which are highly useful in the production of ground coats for iron and steel sheets, hollow ware and the like, made in accordance with the present invention. It will be understood that various other frit formulae may be employed using lithium manganite and/or lithium cobaltite for the production of improved ground coats and cover coats and that the proportions of the ingredients may be varied, within certain limits, without departing from the novel and useful principles disclosed herein. All parts set out below are by weight.

Example 1

| | |
|---|---|
| Borax | 450 |
| Feldspar | 460 |
| Quartz | 620 |
| Soda ash | 230 |
| Sodium nitrate | 125 |
| Fluorspar | 120 |
| Lithium manganite | 20 |
| Nickel oxide | 4 |
| Lithium cobaltite | 2 |

Example 2

| | |
|---|---|
| Borax | 370 |
| Feldspar | 480 |
| Quartz | 640 |
| Soda ash | 190 |
| Fluorspar | 90 |
| Sodium nitrate | 80 |
| Lithium manganite | 33 |
| Nickel oxide | 8 |
| Lithium cobaltite | 2 |

Example 3

| | |
|---|---|
| Borax (anhydrous) | 220 |
| Feldspar | 430 |
| Quartz | 613 |
| Soda ash | 200 |
| Sodium nitrate | 100 |
| Fluorspar | 96 |
| Calcspar | 70 |
| Lithium manganite | 65 |

The frits are made in the usual manner of preparing enamel frits, namely, by melting the ingredients and pouring the molten mass into water. In use, where the frits are to be made up into enamel slips for spraying, dipping or slushing operations, the usual mill additions may be made thereto. Thus, by way of illustration, a suitable mill addition for Examples 1 and 2 comprises, for each 100 pounds of frit, 6½ pounds of clay, 4 pounds of feldspar, 10 ounces of borax, 2 ounces of magnesium carbonate, and 45 pounds of water. The mixture is ground to a desired degree of fineness, pursuant to usual practices. The final product, which has a specific gravity of 1.65, may be utilized as a ground coat in dipping operations, a temperature of about 1550 to 1600 degrees F. for about 4 minutes or more being satisfactory for the burning or firing operation.

While the invention has been described in detail, it is to be understood that the scope thereof is not to be limited other than is set forth in the claims.

What is claimed as new and desired to be protected by Letters Patent of the United States is:

1. A silicious vitreous enamel frit for application to a ferrous base, said frit containing at least one lithium compound selected from the group consisting of lithium manganite and lithium cobaltite in proportions of about 0.5% to about 5% of lithium manganite and about 0.05% to about 3% of lithium cobaltite.

2. A silicious vitreous enamel frit for application to a ferrous base, said frit being essentially free from cobalt oxide, said frit containing at least one lithium compound selected from the group consisting of lithium manganite and lithium cobaltite in proportions of about 0.5% to about 5% of lithium manganite and about 0.05% to about 3% of lithium cobaltite.

3. A silicious vitreous enamel frit for application to a ferrous base, said frit containing feldspar, quartz, borax, soda ash, sodium nitrate, fluorspar, and from about 0.5% to about 2% of at least one lithium compound selected from the group consisting of lithium manganite and lithium cobaltite.

4. A silicious vitreous enamel frit for application to a ferrous base, said frit containing from about 0.05% to about 1% of lithium cobaltite.

5. A silicious vitreous enamel frit for application to a ferrous base, said frit containing feldspar, quartz, soda ash, sodium nitrate, fluorspar, and from about 0.05% to about 1% of lithium cobaltite.

6. A silicious vitreous enamel frit for application to a ferrous base, said frit containing from about 0.5% to about 2% of lithium manganite.

7. A vitreous enamel resulting from the fusion, with conventional mill additions, of a silicious vitreous enamel frit containing at least one lithium compound selected from the group consisting of lithium manganite and lithium cobaltite, said lithium compounds being present in proportions of about 0.5% to about 5% of lithium manganite and about 0.05% to about 3% of lithium cobaltite, based upon the weight of the frit.

8. A vitreous enamel resulting from the fusion, with conventional mill additions, of a silicious vitreous enamel frit, essentially free from cobalt oxide, said frit containing at least one lithium compound selected from the group consisting of lithium manganite and lithium cobaltite, said lithium compounds being present in proportions of about 0.5% to about 5% of lithium manganite and about 0.05% to about 3% of lithium cobaltite, based upon the weight of the frit.

9. A vitreous enamel resulting from the fusion, with conventional mill additions, of a silicious vitreous enamel frit containing feldspar, quartz, borax, soda ash, sodium nitrate, fluorspar, and from about 0.5% to about 2%, based on the weight of said frit, of at least one lithium compound selected from the group consisting of lithium manganite and lithium cobaltite.

10. A vitreous enamel resulting from the fusion, with conventional mill additions, of a silicious vitreous enamel frit containing from about 0.05% to about 1% of lithium cobaltite.

11. A vitreous enamel resulting from the fusion, with conventional mill additions, of a silicious vitreous enamel frit containing from about 0.5% to about 2% of lithium manganite.

WALTER M. FENTON.

REFERENCES CITED

The following references are of record in the file of this patent:

UNITED STATES PATENTS

| Number | Name | Date |
|---|---|---|
| 1,261,015 | Enequist | Apr. 2, 1918 |
| 1,443,813 | d'Adrian | Jan. 30, 1923 |
| 2,182,132 | Matthes | Dec. 5, 1939 |

FOREIGN PATENTS

| Number | Country | Date |
|---|---|---|
| 233,295 | Great Britain | 1925 |
| 605,023 | Germany | 1934 |